Apr. 17, 1923. 1,451,706
J. F. MILLER
RESILIENT WHEEL
Filed Oct. 22, 1921  2 sheets-sheet 1
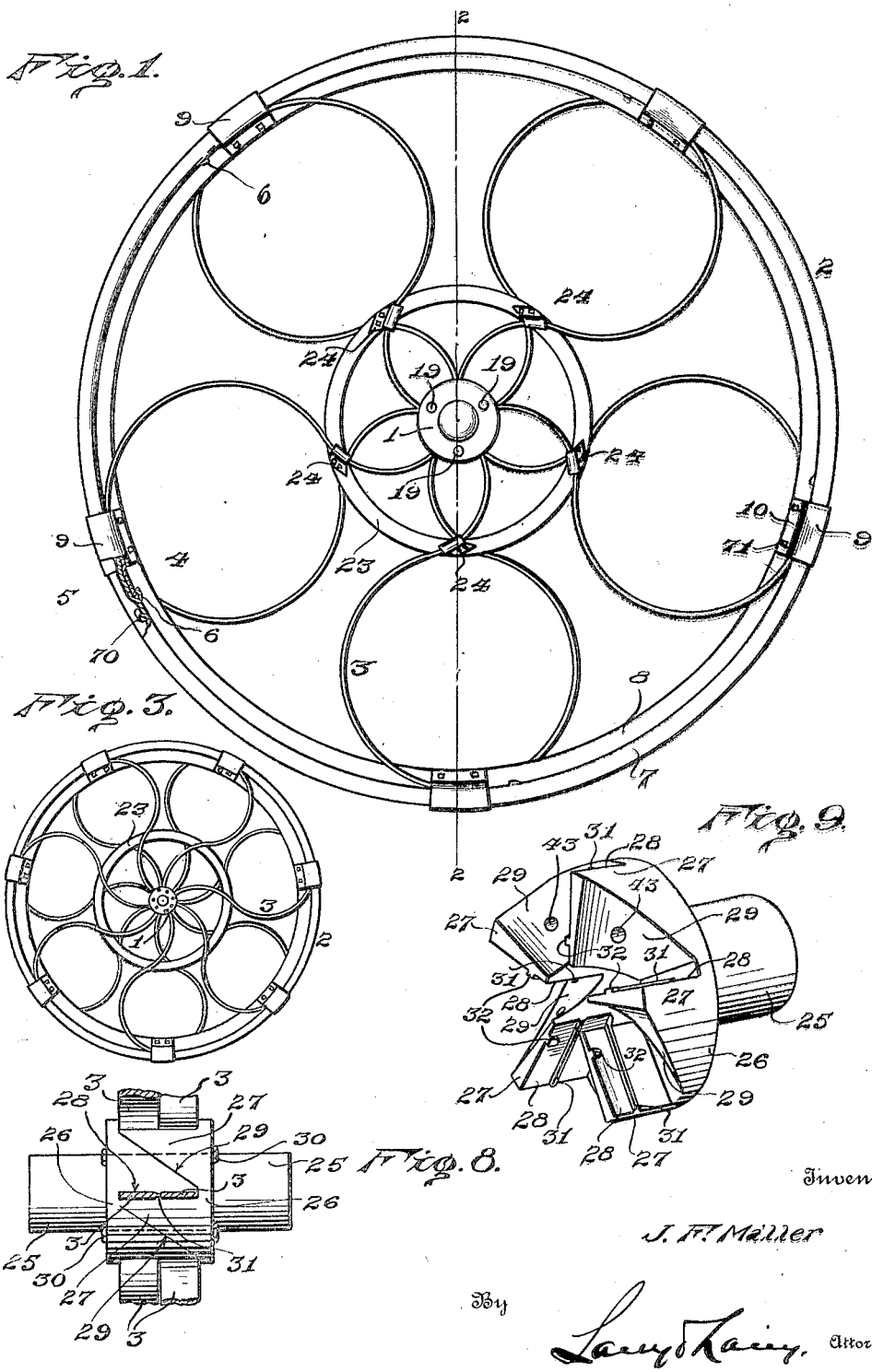

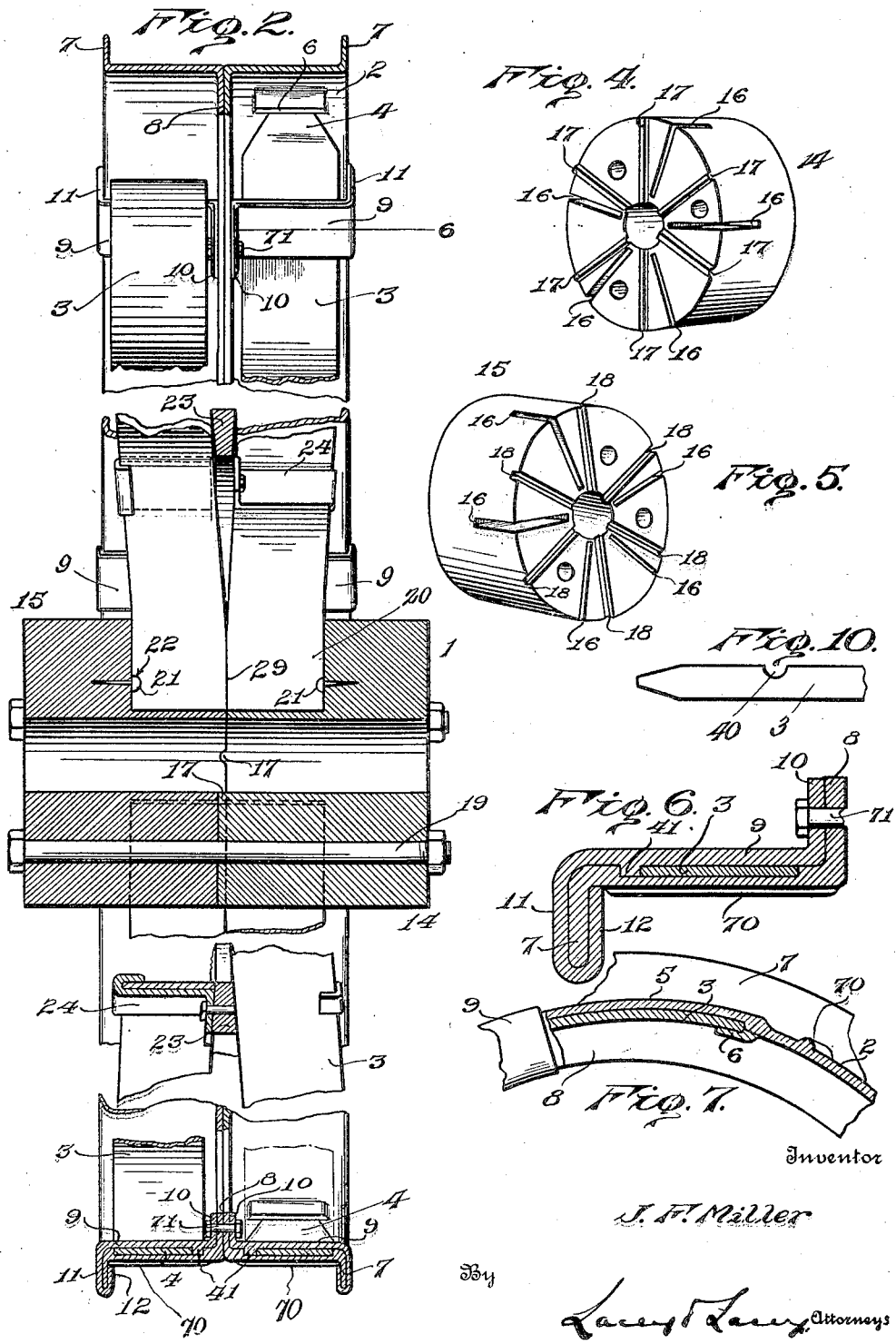

Patented Apr. 17, 1923.

1,451,706

UNITED STATES PATENT OFFICE.

JAMES F. MILLER, OF MINDEN, LOUISIANA.

RESILIENT WHEEL.

Application filed October 22, 1921. Serial No. 509,536.

*To all whom it may concern:*

Be it known that I, JAMES F. MILLER, a citizen of the United States, residing at Minden, in the parish of Webster and State of Louisiana, have invented certain new and useful Improvements in Resilient Wheels, of which the following is a specification.

This invention relates to resilient wheels and has for its object, stated broadly, the provision of a wheel which may use solid or other forms of tires and obtain all the flexibility and easy riding now obtained by the use of pneumatic tires without the disadvantage of punctures and blow-outs to which pneumatic tires are subject. The invention seeks to provide a resilient wheel having improved means for retaining the springs or resilient spokes in place and embodying constructions which will facilitate the removal of a broken spring and the substitution of a new spring therefor. Other objects will appear in the sourse of the following description and the invention resides in certain novel features which will be particularly pointed out in the appended claims.

The invention is illustrated in the accompanying drawings, in which—

Figure 1 is a side elevation of my improved wheel;

Fig. 2 is an enlarged vertical section on the line 2—2 of Fig. 1 with parts broken away;

Fig. 3 is a side elevation of a slightly different form of wheel;

Fig. 4 is a perspective view of one member of the hub shown in Figs. 1 and 2;

Fig. 5 is a similar view of the mating member of the hub;

Fig. 6 is an enlarged detail section on the line 6 of Fig. 2;

Fig. 7 is a longitudinal section of a portion of the rim;

Fig. 8 is a detail showing another form of hub;

Fig. 9 is a detail perspective of one member of the hub shown in Fig. 8;

Fig. 10 is a detail plan view of the outer end of a spoke.

In carrying out the invention, I employ a hub 1, a rim 2, and resilient spokes 3 attached at their inner ends to the hub and at their outer ends to the rim. The resilient spokes are flat bands of spring steel bent in ogee form and having their outer curved portions defining arcs of considerably greater radius than their inner portions. The hub is constructed in two mating members, the inner ends of the springs being engaged and held by the opposed ends of the hub members. The outer ends 4 of the springs are preferably tapered and fit within a seat or depression 5 in the inner circumferential face of the rim to engage under a lip or strap 6 which may be brazed upon the rim so that the formation of openings in the rim will be avoided. The rim is constructed at its side edges with outstanding flanges 7, between which a tire is to be fitted and by which the tire may be retained, while between said flanges ribs 70 may be formed upon the external circumference of the rim to be embedded in the tire and aid in preventing slipping of the same. These ribs may be disposed obliquely or at a right angle to the plane of the wheel. On its inner surface, at its center, the rim is provided with a longitudinal rib 8 which separates the outer ends of the spokes and aids in preventing transverse movement of the same, it being readily understood from the drawings that the spokes are arranged in pairs, one member of each pair being disposed at each side of the central plane of the wheel. To further retain the outer ends of the spokes in place, I employ transverse clips 9 which may conveniently be metal plates each having one end 10 bent inwardly to engage the rib 8 of the rim and its opposite end turned outwardly, as shown at 11, to bear against the outer side of the adjacent flange 7 and then doubled on itself to form a re-entrant angle in which the edge of the flange is received, the extremities 12 of the clips lying close against the inner surfaces of the said flanges 7, as most clearly shown in Figs. 2 and 6. By referring particularly to Fig. 2, it will be seen that the rib 8 is split longitudinally, the rim and the clips being constructed in similar mating halves to facilitate production at a minimum cost. Bolts 71 are inserted through the rib 8 and ends 10 of the clips to secure them together. Transverse displacement of the outer ends of the spring bands or spokes is thus effectually prevented and, inasmuch as the spokes at the opposite sides of the central rib 8 are inserted through the clips from the opposite sides thereof, movement of the clips along the rim is prevented and an efficient fastening provided. Each spoke is also provided in one edge, near its outer end with a notch 40 to be engaged by a lug 41 on the coacting clip 9 so that the spoke will be anchored on the rim without puncturing the latter.

The hub may vary in its detailed construction without involving any departure from the principles of the invention. In Figs. 1, 2, 4 and 5, I have illustrated a hub consisting of mating members 14 and 15 which are substantially identical in construction, being provided with radial notches 16 in their opposed ends which are of such dimensions as to snugly receive the inner extremities of the spokes so that when the members are clamped together the ends of the spokes will be firmly held. On the inner end face of the hub member 14, I provide radial ribs 17, and in the meeting face of the member 15, I provide the radial grooves 18 which are adapted to receive the said ribs 17 so that relative rotation of the assembled hub members will be prevented. These engaging ribs and grooves, furthermore, aid in bringing the hub members into proper relation when assembling the wheel. Bolts 19 are inserted through the hub sections to firmly secure them together and the inner ends of the spokes may be widened slightly, as shown at 20, so as to touch each other and thereby aid in preventing slipping or twisting of the spoke ends longitudinally of the hub. Upon the narrow radial wall of each notch or recess 16 is a projection 21 which may, in some instances, most conveniently be the head of a stud driven into the wall of the recess, as shown in Fig. 2. The adjacent edge of the spoke is constructed with a notch fitting closely over the projection or lug so that the spoke will be prevented from pulling out of the hub.

A flat-sided ring 23 is placed between the series of spokes at the point of merging of the arcs thereof, as shown in Figs. 1 and 3, and clamps 24 connect the ring with the respective spokes, the ring being of sufficient thickness to fit closely between the opposed edges of adjacent spokes. This ring connected with all the spokes furnishes additional anchorage for the hub ends of the spokes, lessens the liability of transverse displacement, and increases the stability of the wheel. The clamps 24 are formed with overhanging lips or flanges to engage the spoke edges more remote from the ring, the intermediate portions of the clamps lying flat against the sides of the spokes and being disposed at right angles to their basal portions which are bolted to the ring.

In the form of hub shown in Figs. 8 and 9, I employ mating hub members comprising sleeves or collars 25 at the opposed ends of which are outstanding annular flanges 26 which are provided on their opposed faces with interengaging locking and clamping lugs 27. Each lug 27 has one face 28 disposed parallel with the axis of the hub and another face 29 disposed obliquely with respect to the axis, and the obliquely disposed faces of the two members are presented to each other when the members are assembled so that when the members are brought together and secured by bolts 30 the lugs will be caused to move angularly relative to each other and bring their opposed longitudinal faces 28 firmly against opposite sides of the inner ends of the spokes, as will be readily understood upon reference to Fig. 8, the ends of the spokes being thereby firmly clamped and held. Upon the face 28 of each lug is a central rib 31 which fits between the adjacent edges of the spokes, as shown in Fig. 8, to prevent transverse oscillation or rocking of the spokes, and a shoulder or teat 32 is also provided on each face 28 to engage a corresponding notch in the edge of the spoke to prevent withdrawal of the spoke. The bolt holes 43 may be of perceptibly greater diameter than the securing bolts in order to accommodate possible lateral play in asembling.

It will be readily seen from the foregoing description, taken in connection with the accompanying drawings, that I have provided a simple and efficient construction whereby a resilient wheel will be provided which will pass over irregularities in the surface of a road without transmitting excessive vibration to a vehicle and will, therefore, subject the occupants of the vehicle to no inconvenience or discomfort. When a load is placed upon the wheel, the compression of some of the spokes which results will create a tendency in the outer portion of the spokes to flatten along the inner surface of the rim and thereby increase the bearing contact of the spoke with the rim so that it will be enabled to sustain the load without breaking and without collapse of the wheel. Moreover, inasmuch as the inner and outer portions of the spokes are curved in reverse directions the spoke tends to compress in opposite directions from the radius of the wheel passing through the ends of the spoke and, consequently, the reaction of the spoke, as the travel of the wheel relieves it of the load, is rapid and easy. In all forms of the hub, the ends of the spokes are held by opposed mating members which effectually clamp the inner extremities of the spokes and hold them against movement in all directions. The removal of a broken spoke and the substitution of a new one therefor is also facilitated and inasmuch as neither end of the spoke is punctured by securing devices, the full strength of the spoke is utilized. In actual practice, I prefer to employ an odd number of pairs of spokes in the wheel as one pair of spokes will then be opposed to the space between two successive pairs of spokes and a more continuous resilient action is obtained than if each pair of spokes were diametrically opposite another pair of spokes.

Having thus described the invention, what is claimed as new is:

1. A resilient wheel comprising a hub, resilient spokes having their inner ends secured by the hub and their outer ends fitted against the inner surface of the rim with their extremities engaging in the rim, and clips fitted transversely upon the rim and having at their ends re-entrant angles fitting around the flanges of the rim and having their intermediate portions passing over the ends of the spokes whereby to hold them flat against the inner surface of the rim.

2. A resilient wheel comprising a hub, resilient spokes having their inner ends secured by the hub, a rim provided with a central longitudinal rib on its inner circumference, the outer ends of the spokes lying flat against the inner circumference of the rim at opposite sides of said rib, and clips passing across the outer ends of the spokes and the inner circumference of the rim and engaging the edges of the rim and seating against and secured to the rib on the rim.

3. A resilient wheel comprising a hub, a rim provided with a central longitudinal rib on its inner circumference and having outstanding flanges at its edges and provided at intervals with pockets, resilient spokes having their inner ends secured in the hub and their outer ends disposed against the inner circumference of the rim at opposite sides of the central rib thereon, the extremities of the spokes engaging in the pockets in the rim and clips fitted transversely of the rim and passing over the outer portions of the spokes whereby to hold the same against the inner circumference of the rim, the said clips being provided with inwardly projecting seats to engage the rib on the rim and having re-entrant flanges at their outer ends to engage around the outstanding flanges at the edges of the rim.

4. A resilient wheel comprising a hub, a rim having spaced circumferentially extending seats upon its inner circumference, transverse lips upon the rim each overhanging one end of one of the seats, and resilient spokes disposed longitudinally of the wheel and having their inner ends secured in the hub and their outer ends fitting in the seats circumferentially of the rim with their extremities engaging under the transverse lips, said lips having end portions preventing transverse movement of the ends of the spokes.

5. A resilient wheel comprising a hub, a rim, resilient spokes arranged in pairs with the members of each pair at opposite sides of the central longitudinal plane of the wheel and having their inner ends secured in the hub and their outer ends secured to the rim, the spokes having their outer and inner portions defining reversely arranged arcs lying in planes parallel with the longitudinal plane of the wheel, a ring disposed between the spokes in the longitudinal plane of the wheel, and means for securing the spokes to opposite sides of the ring at the points of merger of the arcs of the respective spokes.

6. A resilient wheel comprising a rim, a hub consisting of mating sections having longitudinally extending radial recesses in their opposed ends, resilient spokes arranged in pairs having their outer ends secured to the rim and their inner ends fitted in the radial recesses in the hub and alined longitudinally of the hub, the inner ends of the spokes being provided with notches, projections on the sections of the hub engaging said notches, and means for securing the sections of the hub together.

In testimony whereof I affix my signature.

JAMES F. MILLER. [L. S.]